Patented Mar. 27, 1923.

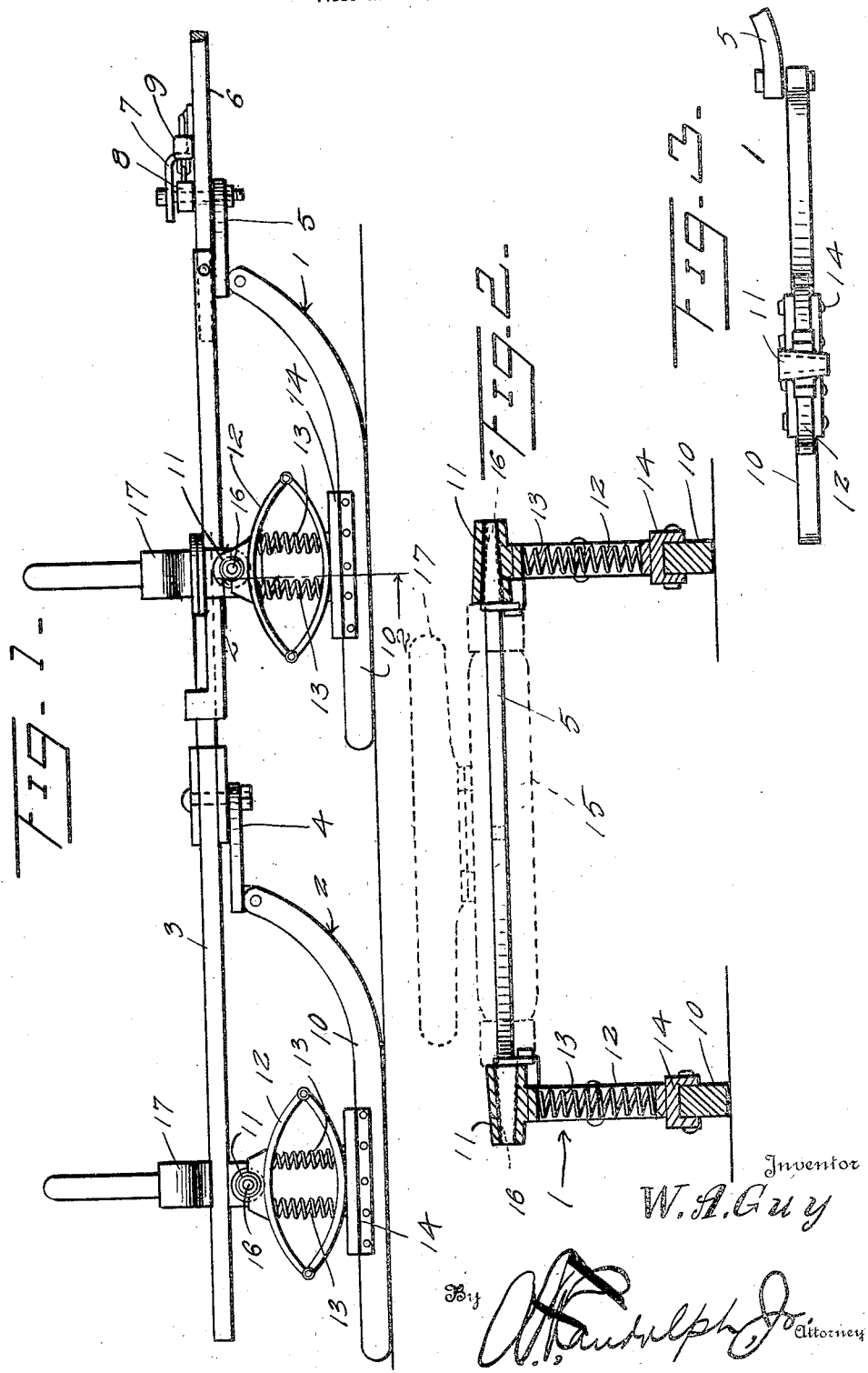

1,449,993

UNITED STATES PATENT OFFICE.

WILEY A. GUY, OF SLAYTON, MINNESOTA.

SLED ATTACHMENT.

Application filed April 12, 1922. Serial No. 551,965.

*To all whom it may concern:*

Be it known that I, WILEY A. GUY, a citizen of the United States, residing at Slayton, in the county of Murray and State of Minnesota, have invented certain new and useful Improvements in Sled Attachments; and I do hereby declare the following to be a full, clear, and exact description of the invention, such as will enable others skilled in the art to which it appertains to make and use the same.

This invention has relation to means whereby a vehicle may be easily and quickly converted into a sled when required so as to glide over snow and ice.

The invention provides a pair of bobsleds to replace the front and rear wheels of a vehicle, whereby the latter may be readily converted into a sled and quickly adjusted to normal condition when required, each bobsled including runners and spring knees, thereby adding largely to the comfort of the occupant of a vehicle equipped with the invention.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application:

Figure 1 is a side view of the running gear of a farm wagon having a pair of bobsleds embodying the invention applied thereto, Figure 2 is a transverse section on the line 2—2 of Figure 1, and Figure 3 is a detail view.

Corresponding and like parts are referred to in the following description and designated in the several views of the drawings by like reference characters.

The numerals 1 and 2 designate a pair of bobsleds which are of similar or like construction each embodying runners which are connected by hounds. The runners 10 of the rear sled 2 are connected by hounds 4. The runners 10 of the front sled 1 are connected by hounds 5.

The sleds are of like construction, hence a detail description of one will suffice for a full understanding of both. The runners 10 may be of any usual or preferred construction and spring knees are connected thereto and support and carry thimbles 11 which are adapted to receive the arms or spindles 16 of the axles 15 of the running gear of the wagon or vehicle after the usual wheels have been removed therefrom. The thimbles 11 are secured to the axle arms or spindles by the same means employed to retain the wheels thereon when the latter are in position. Each spring knee comprises an elliptic spring 12 and a pair of helical springs 13 interposed between the members comprising the elliptic spring. The thimble 11 is disposed centrally of the upper member of the elliptic spring and may form a part thereof, or be attached thereto in any preferred way. The elliptic spring may be secured to a runner 10 in any manner and, as shown, a member 14, attached to or forming a part of the lower member of the elliptic spring, is riveted or bolted to the runner, or secured thereto in any preferred way.

The knees of sleds are usually rigid but the present invention provides spring knees whereby to materially supplement the springs of the vehicle in neutralizing and absorbing shock and vibration with the result that the occupant of a vehicle equipped with a sled attachment constructed in accordance with the present invention experiences ease and comfort without being subjected to jolt or jar. When placing the attachment in position, it is necessary only to remove the wheels of the vehicle and to substitute the runners, the thimbles 11 being slipped over the spindles or arms 16 of the axles 15 and secured thereto by the usual axle nuts or in any preferred way.

The running gear illustrated is of ordinary construction such as generally provided for farm wagons and comprises reach 3, bolsters 17, pole or tongue 6, hammer strap 7, doubletree 8, and singletrees 9. The rear bobsled 2 is fitted to the rear axle and the hounds 4 are connected to the reach 3. The front bobsled 1 is attached to the front axle and the hounds 5 are connected to the pole or tongue 6. No change in the running gear is necessary in adapting the invention thereto to convert the same into a sled.

What is claimed is:

1. A sled comprising runners, spring knees, and thimbles carried by the spring knees and adapted to receive the arms or spindles of an axle.

2. A sled attachment comprising runners, elliptic springs secured to the runners, and thimbles carried by the elliptic springs and adapted to receive the arms or spindles of a vehicle axle.

3. A sled attachment comprising runners, elliptic springs secured to the runners, helical springs supplementing the action of the elliptic springs, and thimbles carried by the elliptic springs and adapted to receive the arms or spindles of a vehicle axle.

4. A sled attachment comprising runners, elliptic springs, attaching members carried by the lower elements of the elliptic springs and secured to the runners, and thimbles carried by the upper elements of the elliptic springs and adapted to receive the arms or spindles of a vehicle axle.

In testimony whereof I affix my signature in presence of two witnesses.

WILEY A. GUY.

Witnesses:
 BURT I. WELD,
 C. W. MECK.